UNITED STATES PATENT OFFICE.

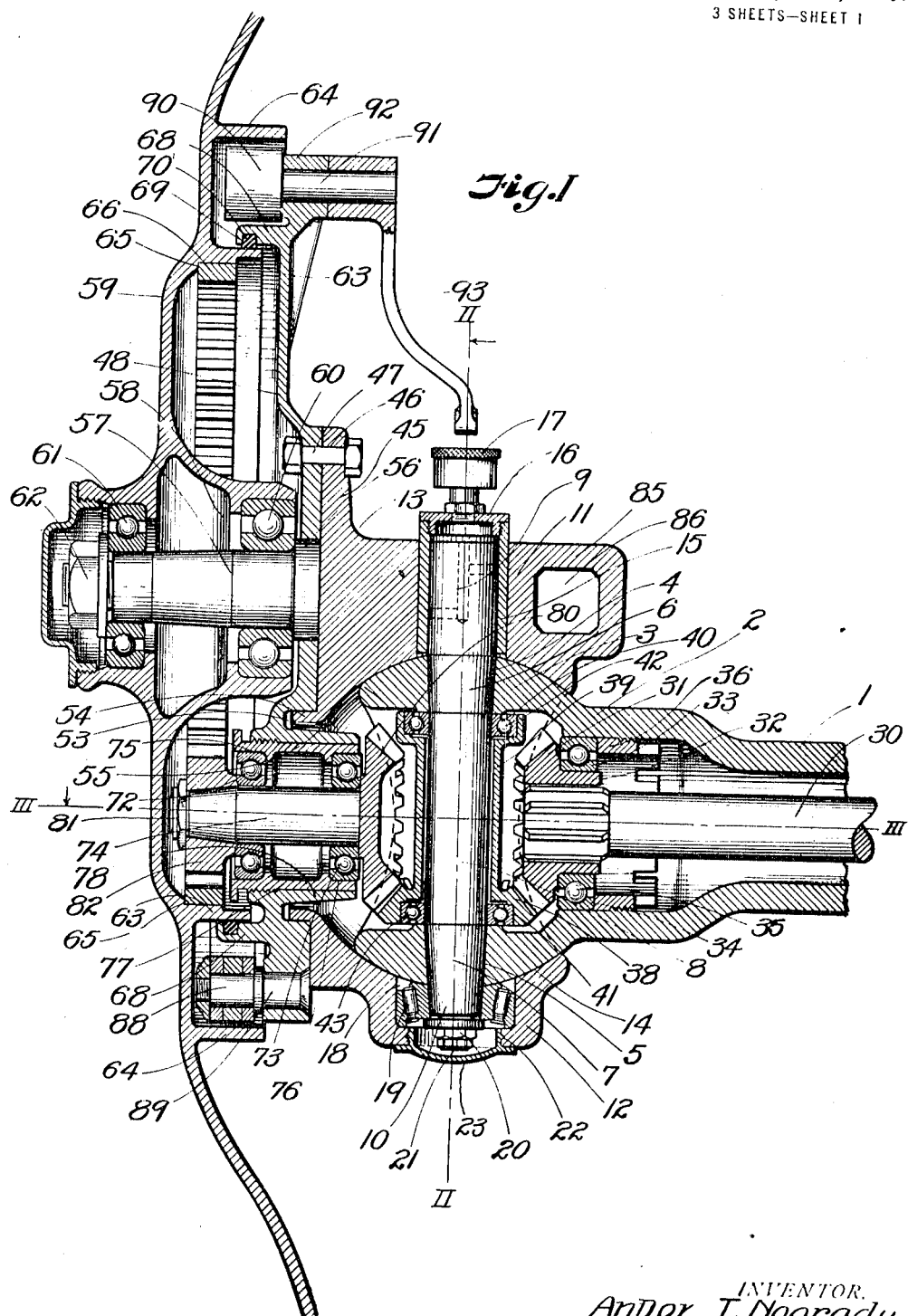

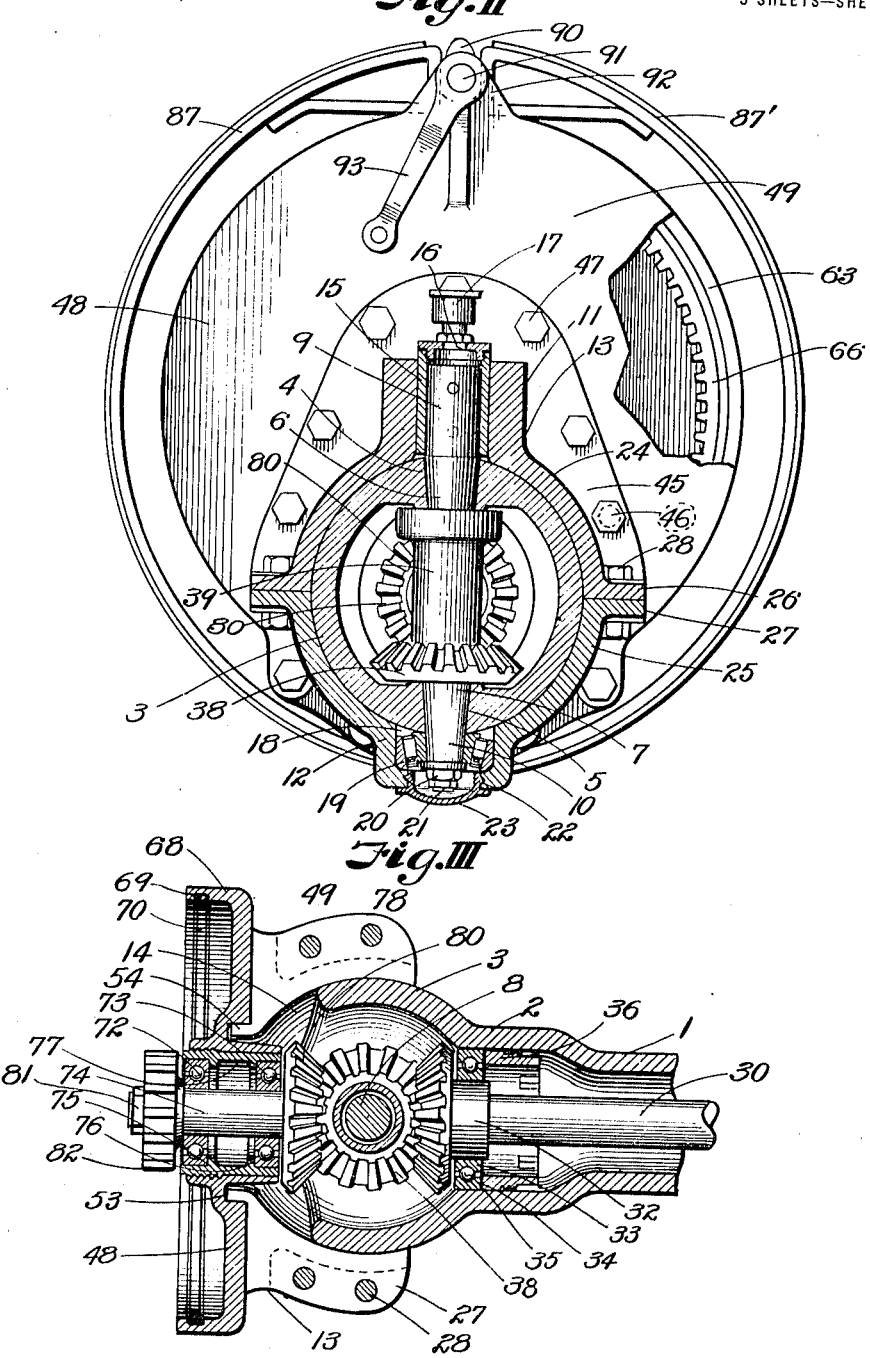

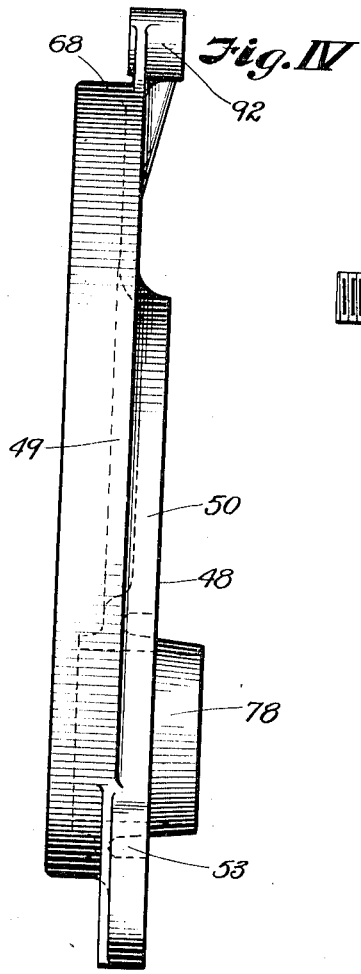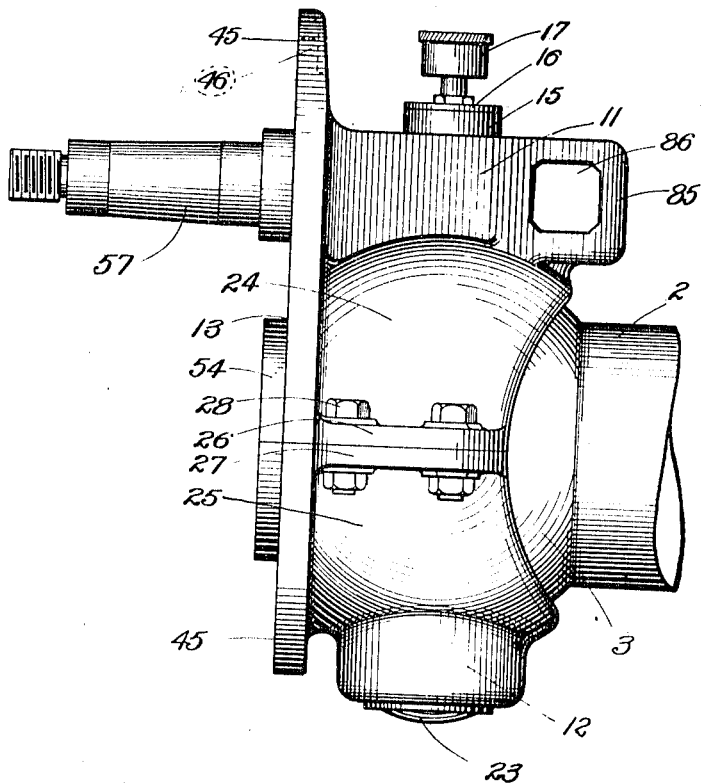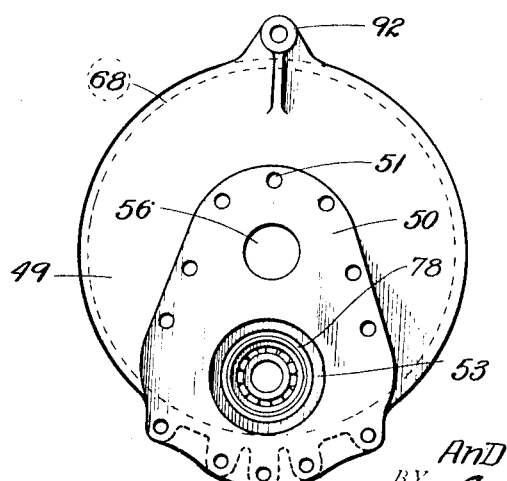

ANDOR T. NOGRADY, OF WICHITA, KANSAS.

DRIVING-GEARING FOR MOTOR-VEHICLES.

1,316,918.  Specification of Letters Patent.  Patented Sept. 23, 1919.

Application filed June 25, 1917. Serial No. 176,737.

*To all whom it may concern:*

Be it known that I, ANDOR T. NOGRADY, a citizen of the United States, residing at Wichita, in the county of Sedgwick and State of Kansas, have invented certain new and useful Improvements in Driving-Gearing for Motor-Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to driving gearing for motor vehicles and more particularly to gearing for vehicles of a four wheel drive type, the principal object of the invention being to provide an improved wheel mounting through which power may be applied without interference with the steering action of the wheels.

Further objects of the invention are to effectively inclose the gearing and provide improved details of construction whereby assembly of the parts is facilitated and a durable and substantial mounting effected.

In the preferred embodiment of the invention, illustrated in the accompanying drawings:

Figure I is a central, vertical section of a portion of a wheel and driving gearing constructed according to the present invention.

Fig. II is a transverse, vertical section of the same on the line II—II, Fig. I.

Fig. III is a horizontal, section on the line III—III, Fig. I.

Fig. IV is a side view of one of the wheel housing plates.

Fig. V is a side view of the gear housing and wheel axle, particularly illustrating the horizontally-divided, spherical housing section.

Fig. VI is a reduced end view of the housing plate shown in Fig. IV.

Referring more in detail to the drawings:

1 designates either a front or rear axle of a motor vehicle equipped with driving gearing according to the present invention; the axle being of tubular form and provided at its opposite ends with enlarged bearing portions 2 and outwardly opening spherical housings 3 wherein the individual wheel driving gearing is located.

Alining vertically above and below the center of the housing 3 are downwardly tapered openings 4—5 of different diameters for seating similarly tapered sections 6—7 of a pivot pin 8, having pivot sections 9—10 respectively at its upper and lower ends extending from the spherical housing and revolubly mounted within upper and lower bearing portions 11—12 of a knuckle casting 13, having an inwardly opening spherical socket 14 therein which incloses the spherical end 3 of the axle 1 and is pivotally mounted thereon to permit horizontal movement of the knuckle and steering of the vehicle.

To facilitate assembly of the parts, the casting 13 is horizontally divided into upper and lower sections 24—25 which, when assembled, respectively inclose the upper and lower halves of the spherical housing 3, and are provided along their adjacent peripheries with flanges 26—27 through which bolts 28 may be extended to join the parts together about the spherical axle portion.

The upper end 9, of the pivot pin, is revolubly contained within a bushing sleeve 15, carried in the bearing 11, and closed at its upper end by a cap 16 which carries cup 17 containing lubricant for the bearing. The lower bearing portion 12 is provided with an upwardly opening socket 18, wherein antifriction rollers 19 are located to engage the lower end of the pivot pin, and the pin is held against upward movement by a nut 20 which is threaded onto a shank 21 at the lower end of the pin to engage the antifriction bearing and seat the same solidly against the lower face of the spherical housing.

Access to the lower end of the pin 8 is provided through an opening 22, in the base of the cup 18, the opening being normally closed by a cap 23, that is threaded therein and serves to exclude dust or dirt from the bearing parts.

Extending longitudinally within the tubular axle 1 and terminating at its outer end within the housing 3 is a drive shaft 30, and keyed to the end thereof is a bevel gear wheel 31 having an inwardly extended collar 32. Mounted on the collar 32 is a ball race 33 which mates with a similar race 34 in the axle enlargement 2 to receive balls or antifriction members 35, whereby the inner end of the shaft is revolubly and substantially supported, the bearings being held in position by a sleeve 36 which is threaded into the axle previously to the placing of the bearings and against which the inner edges of the bearings seat to prevent their inward displacement.

The gear wheel 31 meshes with an upwardly facing bevel gear ring 38 formed on the lower end of a sleeve 39 which incloses that portion of the pivot pin 8 within the housing 3 and is provided at its opposite ends with outwardly opening bearing sockets 40—41, containing anti-friction bearings 42—43 in engagement with the pin 8 and providing substantial mounting for the gear wheel, the bearings seating against the upper and lower faces of the housing opening and permitting longitudinal movement of the sleeve.

The casting parts forming the housing 13 are provided at their outer faces with flat flange plates 45, having apertures 46 adjacent their peripheries for receiving bolts 47, whereby the knuckle is attached to a wheel drum plate 48 (Figs. IV—VI), comprising a circular body portion 49, having a raised central section 50 provided with apertures 51 adapted to register with the apertures 46 to receive the bolts 47.

To stabilize the connection between the plate 48 and hold the knuckle sections together, I provide the plate 48 with an annular channel 53, concentric with the horizontal center of the socket 14 and adapted to snugly receive collar flanges 45 which are integral with and extend from the outer face of the knuckle sections. The flanges 54 not only serve to stabilize the connection between the knuckle section and housing casting, but also form a channel 55 for a gear bearing presently described.

57 designates a wheel spindle or axle, preferably formed integral with the knuckle casting 13 and extending from a point on the outer face thereof in vertical alinement with the plane of the shaft 30, when the vehicle wheels are at right angle to the shaft, through an opening 56 in the plate 48 into the hub 58 of a ground wheel 59, which is revolubly mounted on anti-friction members 60—61, carried by the spindle adjacent the inner and outer ends and held in functional position by a nut 62, which is threaded onto the end of the spindle and seats against the outer bearing 61.

The body of the wheel 59 is preferably of iron, and cast concentrically thereon are inwardly-facing spaced flanges 63—64; the inner flange 63 forming the rim of an inclosing drum and having an annular seat 65 in its inner face within which a toothed ring or driving rack 66 is rigidly fixed.

In order that the drum formed by the plate 48, wheel body 59 and rim flange 63 may be dust proof, an annular flange 68 is extended from the plate 48 concentrically about the spindle 57 over the wheel flange 63 and provided, on its inner face, with an annular groove 69, wherein a felt washer 70 is seated to engage the outer face of the flange 63.

Revolubly mounted in horizontal alinement with the shaft 30 and supported adjacent its opposite ends in anti-friction members 72—73 is a stub shaft 74; the anti-friction members being carried in outwardly facing cups 75—76 at opposite ends of a sleeve 77 which is mounted in and held by a threaded connection to a sleeve 78, cast integrally with the drum plate 48 and extended from opposite faces thereof to provide a maximum distance between the bearings, one end of the sleeve being projected concentrically through the base opening 55 of the socket 14, within and in spaced relation to the ring flange 54.

Fixed to the inner end of the shaft 74 is a bevel gear wheel 80, which, at its lower edge, travels in mesh with the gear wheel 38 on the vertical pivot pin 8. Keyed to the outer end of the shaft, and held thereon by a nut 81, is a gear pinion 82, which travels in mesh with the gear ring 66 so that operation of the drive shaft 30, through the gear provided, will actuate the ground wheel, while at the same time horizontal pivotal movement of the knuckle casting may be effected to effect steering of the vehicle.

To effect the steering operation, I provide the upper knuckle casting section 24 with an extended boss 85 having a transverse aperture 86 for receiving a steering arm (not shown), which may be connected with and controlled by the usual steering mechanism at the driver's seat of the vehicle.

The wheel is also equipped with brake mechanism of the internal, double-acting band type, comprising paired, arcuate brake shoes 87—87' (Fig. II), which are pivotally mounted on the end shaft 88 (Fig. I) of a pin or bolt 89 that is fixed to the plate 48 and adapted for expansion by a head 90 on the end of a rocker shaft 91, revolubly carried in a bearing boss 92 at the top of the plate 48, so that the members of the head may engage the inner face of the wheel flange 64 to effect the braking operation. The shaft 91 is operated by a rocker lever 93, to effect rotation of the rocker head 90 and expansion or contraction of the brake bands; the rocker lever being operated by suitable mechanism (not shown) by the driver of the vehicle.

Assuming that the parts are so constructed, in assembling the same about the spherical axle housing, the gear wheel 38 is first properly located and locked in position by inserting the pivot pin 8. The upper and lower knuckle sections 24—25 are then applied to opposite faces of the housing with the ends of the pivot pin properly located in the bearing portions 11—12 and the sections joined together by the bolts 28 to inclose the spherical socket 3 within the housing.

The plate 48, carrying the shaft 74 and gear wheels 80—82, is then applied to the flat face plate of the knuckle castings with the spindle 57 and collar 54 projecting respectively within the aperture 56 and channel 53, and is solidly attached to the knuckle plate by the bolts 47.

The ground wheel 59 is then applied to the spindle 57 and locked thereon by the nut 62 to hold the wheel gear band 66 in operative engagement with the pinion 82.

With the parts assembled as described, it is apparent that power from the driving shaft 30 is transmitted to the ground wheel while at the same time the latter is free to pivot horizontally to permit its steering operation and that as the vehicle is supported on an axle, separate from the driving axle, no weight will be sustained by any of the driving parts and there will be a minimum amount of wear thereon.

It is also apparent that by so constructing the housing parts, their assembly is facilitated and a substantial and rigid housing provided.

While I have, in order to convey a clear understanding of the invention, illustrated and described certain specific details of structure, I do not wish to be understood as limiting the invention to such specific structure, as modifications in structure may be made without departing from the scope of the invention.

Having thus described my invention, what I claim as new therein, and desire to secure by Letters-Patent, is:

1. In a motor vehicle, an axle provided at its end with an outwardly-opening, segmental, spherical housing having vertically alining openings therein above and below its center, a knuckle member comprising an inwardly opening spherical socket inclosing the housing and having bearings therein registering with said housing openings, a pivot pin extended through said openings, and into said knuckle bearings; said knuckle being divided horizontally on a plane through the center of the socket, forming upper and lower sections, and a plate fixed to and securely joining said sections together about the axle housing.

2. In a motor vehicle, an axle provided at its end with a spherical housing, a pivot pin extending centrally through said housing, a knuckle member comprising separable sections mounted on the said housing and adapted to pivot thereon about the ends of said pin, a spindle extending from one of said knuckle sections, a wheel drum plate fixed to said sections to retain the same about the housing and having a central opening therethrough for receiving said spindle and a wheel mounted on the said spindle.

3. In a motor vehicle, an axle provided at its end with a spherical housing, a pivot pin extending centrally through said housing a knuckle member comprising upper and lower sections mounted on said housing, each inclosing a half thereof and adapted to pivot thereabout on the ends of said pin; said sections having continuous flat base portions, a spindle extending from the base of one of said sections, a drum plate provided with a spindle receiving aperture fitted against the bases of said sections and fixed thereto to retain said sections about said housing and a wheel mounted on said spindle.

4. In a motor vehicle, an axle provided at its end with a spherical housing, a vertical pivot pin extended centrally through said housing, a socketed knuckle member comprising upper and lower sections mounted on said housing and adapted for pivotal movement thereon about the opposite ends of said pivot pin; each of said sections inclosing a half of said housing and having flanged base portions forming a flat continuous surface, a spindle extending perpendicularly from the face of one of said knuckle sections, a wheel drum plate, provided with a central aperture for tightly receiving said spindle, fitted against said flanged base portions and fixed thereto to retain the sections about said housing, and a wheel mounted on said spindle and closing said drum for the purpose set forth.

5. In a motor vehicle, an axle provided at its end with a spherical housing, a vertical pivot pin extended centrally through said housing, a socketed knuckle member comprising upper and lower sections mounted on said housing and adapted for pivotal movement thereon about the opposite ends of said pivot pin; and having an opening at the base of said socket and an outwardly extending annular flange inclosing said opening; said sections having flanged base portions forming a flat continuous surface, a spindle extending from the face of the upper section, a wheel drum plate provided with a central aperture for tightly receiving the said spindle and an annular channel for receiving the said annular flange, bolts extended through said drum plate and knuckle section flanges to secure the drum plate in locking relation thereto, a wheel mounted on said spindle and closing said drum and driving mechanism extended through said knuckle socket opening and operatively connected with said wheel.

6. In a motor vehicle, an axle provided at its end with an enlarged, segmental, spherical, housing forming an inwardly opening cup and having vertically alining openings above and below its center, a pivot pin extended through said openings and projecting from opposite faces of the housing, a knuckle member comprising upper and lower sections forming an inwardly opening spherical socket joined horizontally to inclose upper and lower halves of the axle housing; said knuckle having an opening therethrough at the base of said socket in horizontal alinement with the center of said axle housing, a spindle extended from said knuckle in offset relation to the axle, a ground wheel mounted on said spindle, a gear rack concentrically mounted on said wheel, and driving mechanism inclosed within said axle housing and extended through said knuckle socket opening and operatively connected with said wheel rack for the purpose set forth.

7. In a motor vehicle, an axle housing provided at its end with a segmental, spherical, housing forming an inwardly opening cup, a knuckle comprising an inwardly-opening, spherical socket inclosing said housing and adapted for horizontal, pivotal movement thereon; said knuckle being divided horizontally through the center of said socket, forming upper and lower sections for inclosing respective portions of the housing and having an opening therein at the base of said socket, a spindle extending from the knuckle, offset from the axial line of the axle housing, a wheel drum plate fixed to said knuckle concentric with the spindle, having an opening therein registering with the socket opening, a ground wheel mounted on the spindle, an annular rack concentrically mounted on the wheel, and flexible driving mechanism extending through said axle housing and knuckle openings and operatively connected with said wheel rack, for the purpose set forth.

8. In a motor vehicle, an axle housing provided at its end with a segmental, spherical housing forming an outwardly opening cup and having openings therein in vertical alinement above and below its center, a pivot pin extended through said openings and projecting from opposite faces of said housing, a knuckle comprising an inwardly opening, spherical socket inclosing said axle housing and adapted for pivotal movement thereon about the ends of said pin; said knuckle being divided horizontally through the center of said socket forming upper and lower sections for inclosing respective portions of the spherical housing and having an opening therethrough at the base of said socket, a spindle extended from the knuckle offset from the axial line of the axle housing, an outwardly opening wheel drum plate fixed to said knuckle concentric with the spindle, and having a transverse sleeve extending through said socket opening, a ground wheel mounted on the spindle, having an inwardly opening flange thereon inclosed by the outwardly opening wheel drum plate, an annular rack mounted concentrically on the wheel, a drive shaft mounted in said axle housing and extending into said cup, a stub shaft revolubly mounted in said sleeve in horizontal alinement with the axle shaft, a bevel gear wheel fixed on the axle shaft within the housing cup, a similar gear wheel fixed on the inner end of said stub shaft, an idler gear wheel revolubly mounted on the pivot pin and meshing with said bevel gear, a gear pinion fixed on the exterior end of the stub shaft in mesh with the rack, and means for controlling the pivotal movement of the knuckle above the pivot pin.

9. In a motor vehicle, an axle housing provided at its end with a segmental, spherical housing forming an outwardly opening cup and having openings therein in vertical alinement above and below the center, a pivot pin extending through said openings and projecting from opposite faces of said housing, a knuckle comprising an inwardly opening, spherical socket inclosing said axle housing and adapted for pivotal movement thereon about the ends of said pin; said knuckle being divided horizontally through the center of said socket, forming upper and lower sections for inclosing respective portions of the spherical housing and having an opening therethrough at the base of said socket, an annular flange extending from the face of said knuckle about said opening, a spindle extending from the said knuckle offset from the axial line of the axle housing, an outwardly opening drum plate fixed to said knuckle concentric with the spindle having an annular channel therein for receiving the annular flange of the knuckle and having a transverse sleeve therein concentric with the channel and extending into the knuckle socket, a ground wheel fixed on said spindle having concentrically located, inwardly extending flanges thereon; the inner wheel flange being inclosed by a flange of the outwardly facing drum plate, and brake mechanism mounted on the drum plate for engaging the outer wheel flange for the purpose set forth.

10. In a motor vehicle, an axle having a spherical housing at its end, provided with upper and lower pin bearings, a knuckle housing rotatable on the axle housing having bearings concentric with said pin bearings, a pin in the axle housing projected into said bearings, a spindle on the knuckle housing, a wheel on said spindle, gearing on the wheel, gearing between the axle and wheel, and intermediate gearing comprising a member, concentric with the axle, engaging the wheel gearing to drive the wheel from said axle.

11. In a motor vehicle, an axle having a spherical housing, provided with upper and lower pin bearings, a sectional, knuckle housing rotatable on the axle housing, having bearings concentric with said pin bearings and having engaging members, a pin in the axle housing, projected into said bearings, a spindle on one of the knuckle housing members, a wheel rotatable on said spindle, a plate between the wheel and housing, having means coöperative with the engaging members on the knuckle housing to retain said housing sections in assembled relation, gearing on the axle, gearing on the wheel, and intermediate gearing in the housings for driving the wheel from the axle.

In testimony whereof I affix my signature.

ANDOR T. NOGRADY.

Copies of this patent may be obtained for five cents each, by addressing the "Commissioner of Patents, Washington, D. C."